United States Patent [19]
Zumsteg et al.

[11] 3,910,429
[45] Oct. 7, 1975

[54] APPARATUS FOR DISTRIBUTING HOTMIX TO A MULTIPLE BIN STORAGE SYSTEM

[75] Inventors: D. Bruce Zumsteg, Raytown; J. T. Odom, Glasgow; William L. Walkington, Fayette, all of Mo.

[73] Assignee: Standard Havens, Inc., Kansas City, Mo.

[22] Filed: May 28, 1974

[21] Appl. No.: 473,510

[52] U.S. Cl. ............... 214/16 R; 198/65; 198/125; 214/17 B
[51] Int. Cl.² .................. B65G 3/18; B65G 3/20
[58] Field of Search ........... 214/16 R, 17 C, 17 CB, 214/17 B; 193/23; 198/100, 125

[56] References Cited
UNITED STATES PATENTS
3,707,998    1/1973    Dalrmple ........................ 214/17 B
3,777,909   12/1973    Rheinfrank ..................... 214/17 C FOREIGN PATENTS OR APPLICATIONS
825,528   12/1951   Germany ..................... 214/17 CB

*Primary Examiner*—Robert G. Sheridan
*Attorney, Agent, or Firm*—Lowe, Kokjer, Kircher, Wharton & Bowman

[57] ABSTRACT

A rotating conveyor and bin feeder pivotally mounted above a multiple bin storage complex to selectively deliver asphalt hotmix to each of the storage bins. The bin feeder and outer end of the conveyor are carried on a supporting track and the inlet end of the conveyor is pivotally coupled to hotmix delivery equipment. Ductwork is disposed at the discharge of the feeder to remove pollutants emitted from the hotmix during the bin loading operation and a swiveling central utilities connection supplies power to the apparatus.

4 Claims, 2 Drawing Figures

APPARATUS FOR DISTRIBUTING HOTMIX TO A MULTIPLE BIN STORAGE SYSTEM

BACKGROUND AND SUMMARY OF THE INVENTION

In the asphalt industry, the paving material, called "hotmix" in the trade, is produced in a pug mill which mixingly combines dried aggregate with liquid asphalt. From the pug mill the material is usually transferred to surge storage bins from which the hotmix may be loaded into dump trucks for transport to the construction site. Due to technological improvements in preparation and mixing equipment, pug mill production rates have risen sharply in recent years, resulting in a corresponding increase in the demand for bin storage capacity. The modern trend has therefore been to incorporate as many as eight surge bins in a single bin complex in order to meet the additional storage requirements. With the advent of multiple bin systems, various material handling problems have been encountered. One of the major difficulties is providing equipment capable of satisfactorily transferring the hotmix from the pug mill to the respective storage bins.

Because a number of different grades of hotmix are produced, the distributing apparatus must be capable of transporting each different grade to a separate bin. Furthermore, since economics dictate a high production rate in the pug mill, it is necessary that the hotmix be rapidly and continuously transported from the pug mill to the various storage bins. The volatile smoke-like by-product of the hotmix must also be effectively controlled so that is does not escape and pollute the surrounding environment.

Eliminating the segregation of the coarse aggregate contained in the hotmix throughout the transfer process has posed a further problem. The utilization of a drag slat conveyor to transport the hotmix from the pug mill to a feed hopper that intermittently discharges a relatively large volume of hotmix to the bins has proven an effective means of inhibiting segregation. However, if a multiple bin system was to include one or more drag slat conveyors and a feed hopper for each bin, the cost would increase accordingly and possibly become prohibitive.

With these considerations in mind, the primary object of this invention is to provide apparatus for selectively distributing asphaltic hotmix produced in a pug mill to each of the separate bins incorporated in a multiple bin storage complex.

Another object of the invention is to provide apparatus of the character described which eliminates segregation of the coarse aggregate contained in hotmix as the transfer occurs. This feature is achieved by providing a single pulsingly dischargable feed hopper of the type that has proven effective and economical in inhibiting segregation and which is adapted to serve all of the storage bins in the multiple bin complex.

Still another object of the invention is to provide apparatus of the character described that shifts between bins in a minimum amount of time. This feature is achieved by utilizing a circular track structure and a motor driven trolley to pivot the conveyor the shortest distance from one bin to a selected second bin.

A further object of the invention is to provide apparatus of the character described that continuously receives hotmix from the pug mill even as it shifts between bins.

A still further object of the invention is to provide apparatus of the character described that includes means for evacuating the pollutant smoke emitted as the hotmix is charged into a storage bin.

Other and further objects of the invention, together with the features of novelty appurtenant thereto, will appear in the course of the following description.

DETAILED DESCRIPTION OF THE INVENTION

Figure 1:
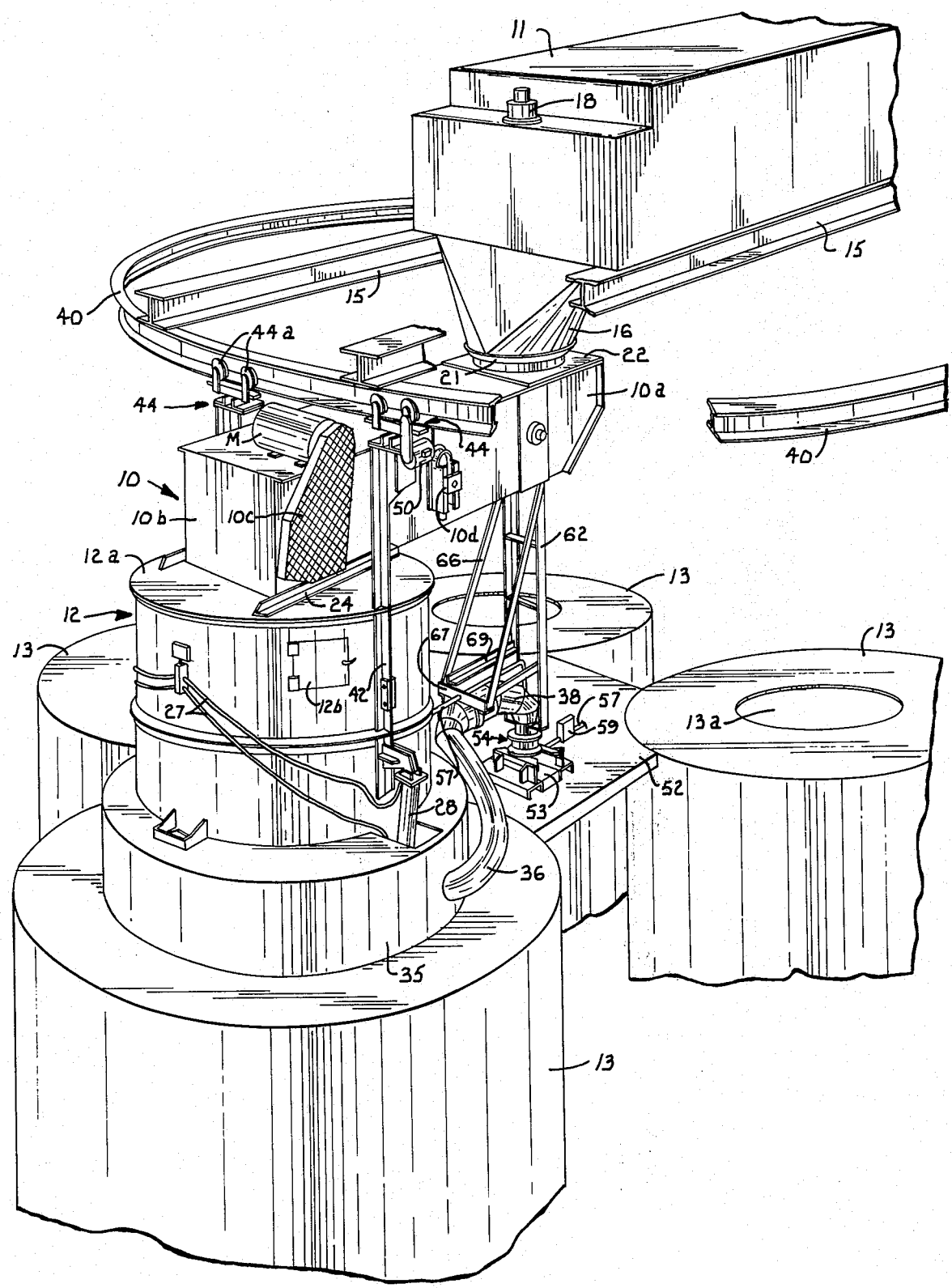
Figure 2:
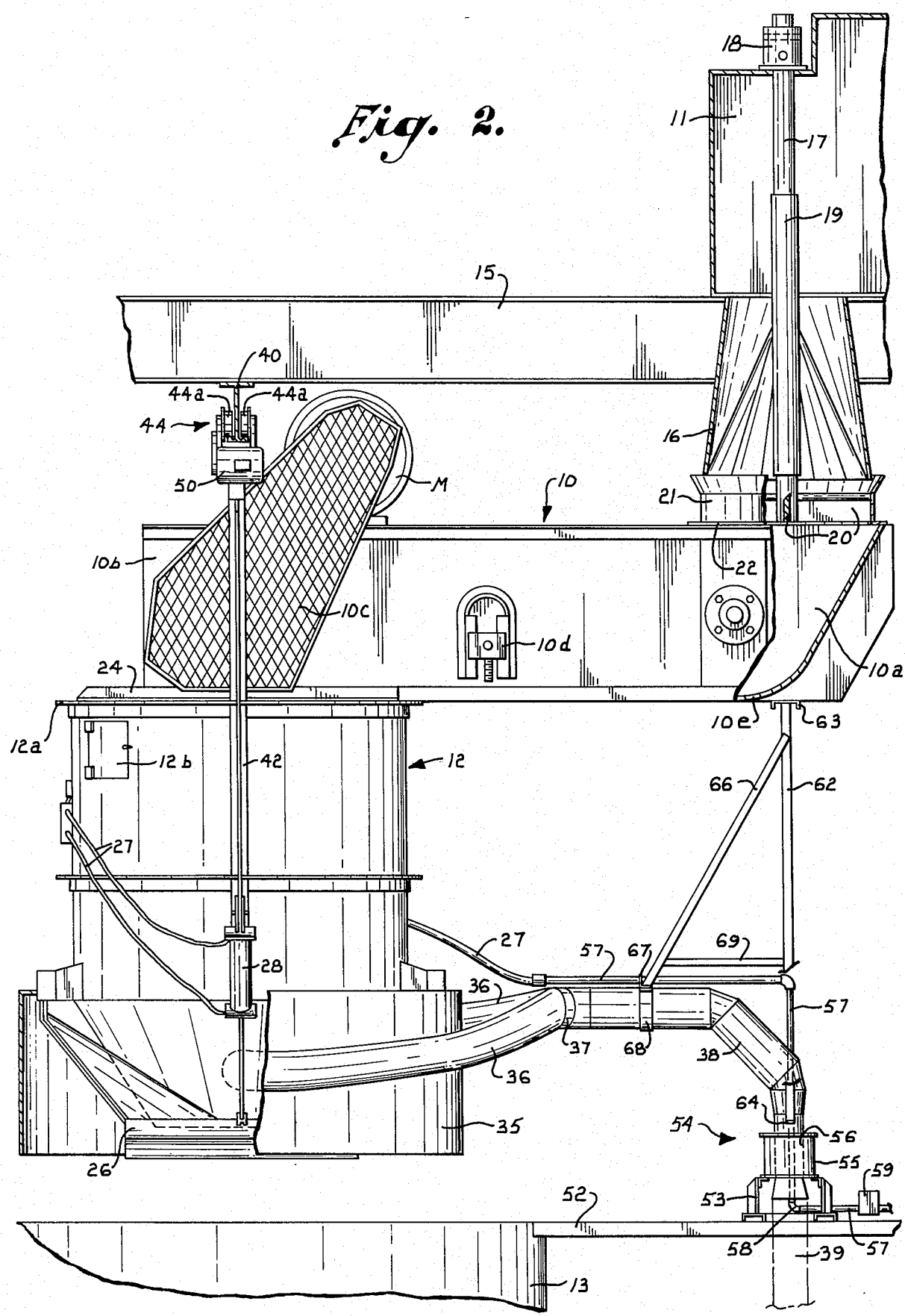

In the accompanying drawings, which form a part of the specification and are to be read in conjunction therewith, and in which like reference numerals are employed to represent like parts in the various views:

FIG. 1 is a perspective view of an apparatus for distributing hotmix to a multiple bin storage system constructed in accordance with a preferred embodiment of the invention showing a pivoting conveyor and attached pulse feed hopper connected intermediate a four bin storage complex and an elevated pug mill, the storage bins and pug mill being only partially shown; and FIG. 2 is a side elevational view of the pivoting conveyor and pulse feed hopper shown in FIG. 1, with portions thereof broken away to better illustrate the details of construction.

Referring now to the drawing in detail, the components of a preferred embodiment of the invention are shown in their normal operating environment above a multi-bin surge storage complex. A pivoting conveyor, generally designated by numeral 10, has its inlet or boot end secured directly below the outlet of an elevated pug mill 11 and has its discharge end connected to a pulse feed hopper 12 for intermittently discharging hotmix to a selected bin 13 of the multi-bin complex. In the bin complex illustrated, four bins 13 are shown and each bin 13 is equidistant from the discharge of the pug mill.

Pug mill 11 (only the outward portion of which is shown) is a mixing apparatus of the preparation plant wherein hot liquid asphalt is mixed with quantities of crushed rock or aggregate of various grades to form the asphaltic hotmix.

A pair of parallel, horizontal structural beams 15 extend along the underside of pug mill 11 and outward beyond the outer end of the pug mill. The outer end of pug mill 11 has a discharge opening in the bottom thereof which is centrally positioned above the bins 13 and which forms an outlet for delivering the hotmix to conveyor 10.

The upright surge bins 13 are basically cylindrical, large volume storage containers. Each bin 13 is supported on a plurality of legs (not shown) as disclosed in U.S. Pat. No. 3,777,909 issued to Rheinfrank on Dec. 11, 1973 for an "Apparatus for Loading Hotmix in a Surge Bin" (said patent incorporated by reference) wherein a drive-through is included to permit asphalt trucks to drive beneath the bin outlet and receive the hotmix. Each bin 13 also has a circular opening 13a formed centrally in its top for receiving the hotmix from the feed hopper 12.

Secured beneath the discharge opening on the underside of pug mill 11 is a chute 16 which directs the hotmix from the pug mill discharge into the receiver or boot 10a of the horizontally disposed conveyor 10. The inward end 10a of conveyor 10 has an inlet opening in its top, while the outward end 10b of the conveyor has a discharge opening in its bottom. For use in this invention, conveyor 10 may be any of several well known types that are suitable for transporting hotmix. The conveyor 10 illustrated in the drawings is a drag slat type with operational characteristics similar to those of the conveyor disclosed in U.S. Pat. No. 3,746,379 issued to Rheinfrank on Sept. 4, 1973 for an "Inclined Drag Slat Conveyor for Hot Asphalt Mix and the Like," which patent is incorporated by reference herein. As disclosed in the patent, conveyor 10 includes a motor M mounted at the discharge end which drives the necessary sprockets, bearings, and drive belt (covered by shield 10c) located interiorly of the conveyor housing. The chain assembly carries a plurality of transfer slats which are yieldably biased by sliding bearings 10d to move adjacently along the floor plate 10e to transport the hotmix from the conveyor inlet 10a to the discharge 10 b.

Conveyor 10 is pivotally connected at its inlet end 10a to pug mill 11 by a vertical shaft 17 which is supported at the top of the pug mill frame by a thrust bearing 18. Shaft 17 passes vertically through the pug mill discharge and chute 16 and throughout a portion of its length the shaft 17 is encased by a protective sleeve 19. Radiating outwardly from the lower end of the shaft 17 at 90° spacings are four vertically oriented plates 20. The outermost end of each plate 20 is welded to the flared conveyor inlet chute 21 which comprises a short cylindrical body and an outwardly diverging conical top portion within which the bottom end of chute 16 is received. Conveyor chute 21 is in turn integrally joined to a centrally bored mounting plate 22. Mounting plate 22 is firmly secured to the conveyor over the top of the inlet opening therein.

Feed hopper 12 is preferably included along with the pivoting conveyor to assist in eliminating segregation of the hotmix. Feeder 12 is secured by means of a pair of angles 24 on the underside of the outward end 10b of conveyor 10 in communication with the conveyor discharge opening on the underside thereof. Feeder 12 is preferably a pulse type feed hopper similar to that described in the Rheinfrank patent "Apparatus for Loading Hotmix in a Surge Bin", U.S. Pat. No. 3,777,909 issued Dec. 11, 1973 which has previously been incorporated by reference herein. The top portion of the hopper is covered by a rain shield 12a and a hinged door 12b in the side of the hopper permits access to its interior for sampling or inspection of the hotmix before it is discharged from the hopper. As disclosed in the patent, a central discharge opening in the bottom of hopper 12 is intermittently opened and closed by pneumatically activated clam gates 26 (FIG. 2) to pulsingly discharge a stream of hotmix from the feeder into the storage bin 12.

The pneumatic system for clam gates 26 includes flexible air hoses 27 appropriately valved to operate pneumatic cylinders 28 coupled to the gates 26. In normal use the pneumatic system is controlled by a volumetric sensing switch located interiorly of the hopper which opens and closes gates 26 in accordance with the volume of hotmix contained within hopper 12.

When the hotmix is discharged from feeder 12 into bins 13, pollutants in the form of smoke-like vapors are generated. To assist in the removal of these pollutants, an open bottom, cylindrical shroud 35 of sufficient dimensions to permit opening and closing of the clam gates 26 surrounds the clam gate region of the feeder and extends downwardly to terminate above the top of bin 13. The shroud 35 is equipped with a pair of flexible conduits 36 fitted through opposite sides of the shroud. At the Y-fitting 37, conduits 36 connect to a common exhaust duct 38 which is rotatably connected at its lower end by a loose telescoping fit with a vertical duct 39 that extends downwardly to a treatment chamber (not shown) wherein the pollutants may be suitably treated. The pressure in ducts 38 and 39 is continually maintained below that in feeder 12 to pull the pollutants through the ductwork and into the treatment equipment.

A circular track 40 formed from an I-beam is mounted above the bin complex to support feeder tank 12 and the outlet end of conveyor 10. The track 40 is secured to the undersides of the horizontal beams 15 and is positioned a suitable distance above and directly over the open top 13a of each bin 13 with vertical shaft 17 located at the geometric center of the track. At opposite sides of feeder 12 are attached vertical beams 42, each of which includes at its top end a trolley assembly 44. The trolley assemblies 44 are of a conventional type and include opposed rollers or wheels 44a on each side of the track 40 that ride on the lower flange of the I-beam.

A small trolley motor 50 is coupled to one of the trolley assemblies 44 (the right hand assembly shown in FIG. 1) to supply rotational power to wheels 44a. Trolley motor 50 is preferably a three-phase reversing electric motor of any type known to those skilled in this art in order to rotatably move the conveyor and feeder in either direction along the track 40. Motor 51 may be remotely activated and is provided with a braking mechanism automatically engaged by a limit switch (not shown) when the feeder 12 is positioned directly over the central inlet opening 13a of a selected bin 13. The motor control circuitry may also include conventional controls to cause the feeder 12 to move to the selected bin 13 by the shortest distance from the bin previously loaded.

A horizontal platform 52 is centrally mounted between the tops of bins 13. A mounting block 53 secured in the middle of platform 52 provides a base for a slip ring assembly 54 which comprises a bank of slip rings 55 having self-contained brushes. The slip rings 55 are conventional electrical components which provide a continuous electrical connection between a stationary power source (not shown) and the rotating equipment. The outside bank of terminals remain stationary while the inside conducting assembly rotates a full 360° and supplies power through electrical leads (not shown) to the conveyor motor M, the trolley motor 50 and the sensing switch controlling the clam gates 26. Slip ring assembly 54 also includes a central bore 56 through which passes exhaust duct 38 and pipe 57 which feeds air to the flexible air hose 27. Pipe 57 enters the vertical portion of duct 38 through an aperture in the duct and passes downwardly through bore 56 within the duct. Beneath the slip ring assembly 54, pipe 57 is joined to a swivel connection 58 which permits the rotation of the pipe through a 360° angle without air leakage at the connection. From the swivel fitting 58, the air supply pipe extends through the side of pad 53 and connects with a pressure sensitive switch 59 which will activate an alarm in the event pressure in the system falls below a predetermined value, and continues to a conventional air pressure source (not shown).

Beneath the conveyor inlet 10a is located a structural framework to support the duct work, air line, and electrical leads and also to provide an effective key between the conveyor 10 and the slip ring assembly 54 during rotation. The framework includes a pair of upright beams 62, the top ends of which are attached to a bar 63 welded to the underside of the conveyor 10 and the lower ends of which are joined to stubs 64 secured to opposite sides of duct 38 slightly above slip ring assembly 54. A pair of parallel angled beams 66 extend from connection near the top of upright beams 62 to connection at their lower end with a cross member 67 which supports the air line 57 and includes a collar 68 secured to its underside to supportingly receive the duct 38. A pair of parallel angles 69 extend horizontally from an intermediate portion of upright beams 62 to connect the bottom ends of angle beams 66 and cross member 67.

In operation of the distributing apparatus, hotmix is supplied to the inlet of conveyor 10. It should be noted that pug mill 11 is shown in the drawings as typical equipment which could supply the material. However, the equipment 11 could also be a conveyor or any other piece of equipment operable to deliver the hotmix to be distributed to the multiple bin system to the inlet of conveyor 10. Hotmix fed to the conveyor 10 is continuously transported along the length thereof and discharged to the feed hopper 12.

Feeder 12 is initially positioned over one of the surge bins 13 by activating trolley motor 51 to drive the trolley assemblies 44 along circular track 40 and thereby pivot conveyor 10 about its pivot shaft 17 until the discharge opening of feeder 12 is adjacently above the bin inlet 13a. Thereafter, the pneumatically activated clam gates 26 are opened and closed at appropriate intervals by means of the volumetric sensing switch to pulsingly discharge successive streams of hotmix into the bin 13.

If the bin in use becomes nearly filled or a different grade of hotmix is to be stored in one of the other bins, the plant operator causes the feeder 12 to completely discharge and the gates 26 to close. A second bin is then selected and the trolley motor 51 is activated to automatically drive trollies 44 along track 40 the shortest distance from the first bin to the second bin. When feeder 12 is positioned with its discharge opening over the inlet of the selected bin, clam gates 26 again operate to discharge the hotmix to the bin. It should be noted that feeder 12 is of sufficient volume and the movement to a second bin is of short duration so that hotmix can be delivered into the feeder as it moves between different bins. Thus the rate of hotmix production and distribution continues uninhibited even while the conveyor pivots between the respective bins.

Although only four storage bins 13 are illustrated herein, it should be evident that the apparatus may be employed to distribute hotmix to any number of bins arranged equidistantly from the conveyor pivot shaft 17.

From the foregoing it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described our invention we claim:

1. Apparatus for distributing material from material delivery equipment to a plurality of storage bins, said apparatus comprising:
   a conveyor having an inlet end supportingly and pivotally connected to said material delivery equipment and an outlet end remote from said material delivery equipment, said conveyor operable to transport material received from said material delivery equipment at said inlet end to said outlet end for discharge therefrom, and adapted to pivot about a vertical pivot axis at said inlet end, said pivot axis being equidistant from each of said storage bins;
   a bin feeder elevated with respect to said bins and connected to said conveyor to receive material from the outlet end thereof and having a discharge opening through which material is discharged to said bins, said feeder including power operated movable closure means associated with said discharge opening to hold material within said feeder and to intermittently dispense material to said bins;
   an overhead track member, arcuate about a point coincident with said vertical pivot axis, supporting from above said bin feeder and said outer end of the conveyor;
   power means adapted to rotatably move said conveyor and bin feeder upon said track member about said vertical pivot axis and to selectively and indexingly position said feeder above each of said bins for the discharge of material thereto;
   a chamber housing connected to said bin feeder to shroud said discharge opening and having a material passage disposed closely adjacent said bin when said feeder is indexingly positioned thereabove to permit delivery of material from said feeder to said bin; and
   an evacuation system including ductwork connected to said chamber housing and equipped with a rotatable fitting to permit pivotal movement of said ductwork keyed to movement of said feeder and conveyor, and vacuum means connected to said ductwork to draw pollutants emitted during discharge of material from said feeder to said bin through said chamber housing and said ductwork.

2. The apparatus as in claim 1 including a rotatable power transmission connection adapted for communicating with a stationary power supply to furnish power to said movable closure means of the bin feeder and to said power means while permitting free rotational movement of said bin feeder and conveyor about said vertical pivot axis.

3. The apparatus as in claim 2 wherein said movable closure means includes a pneumatic activation system and said power transmission connection includes a pneumatic swivel fitting connected to said activation system.

4. The apparatus as in claim 2 wherein said transmission connection includes an electrical slip ring assembly to furnish electrical power to said power means for rotating said bin feeder and conveyor.

\* \* \* \* \*